US006923564B2

(12) United States Patent
Steward

(10) Patent No.: US 6,923,564 B2
(45) Date of Patent: Aug. 2, 2005

(54) SELECTIVELY DEPLOYABLE DRIVING LIGHTS

(76) Inventor: James Michael Steward, P.O. Box 534, Senath, MO (US) 63876

( * ) Notice: Subject to any disclaimer, the term of this patent is extended or adjusted under 35 U.S.C. 154(b) by 245 days.

(21) Appl. No.: 10/303,131

(22) Filed: Nov. 25, 2002

(65) Prior Publication Data

US 2004/0100803 A1 May 27, 2004

(51) Int. Cl.$^7$ .............................................. F21V 7/04
(52) U.S. Cl. .................... 362/549; 362/467; 362/505; 362/513; 296/180.1
(58) Field of Search ................................ 362/549, 467, 362/505, 513, 485, 525, 526, 527, 543; 296/180.1

(56) References Cited

U.S. PATENT DOCUMENTS

| 3,177,355 | A | * | 4/1965 | Trowbridge | 362/467 |
|---|---|---|---|---|---|
| 4,707,014 | A | * | 11/1987 | Rich | 296/180.1 |
| 5,195,816 | A | * | 3/1993 | Moss et al. | 362/460 |
| 5,988,840 | A | * | 11/1999 | Wirtz | 362/513 |
| 6,264,354 | B1 | * | 7/2001 | Motilal | 362/505 |
| 6,350,040 | B1 | * | 2/2002 | Parker | 362/183 |

\* cited by examiner

Primary Examiner—Stephen Husar
Assistant Examiner—James W Cranson, Jr.
(74) Attorney, Agent, or Firm—Dennis B. Haase

(57) ABSTRACT

An improved system for selectively deploying an auxiliary lighting system in which the vehicle onboard power system is utilized to permit the operator of the vehicle to deploy lamps to an in use position and to stow the same in a protected environment.

15 Claims, 2 Drawing Sheets

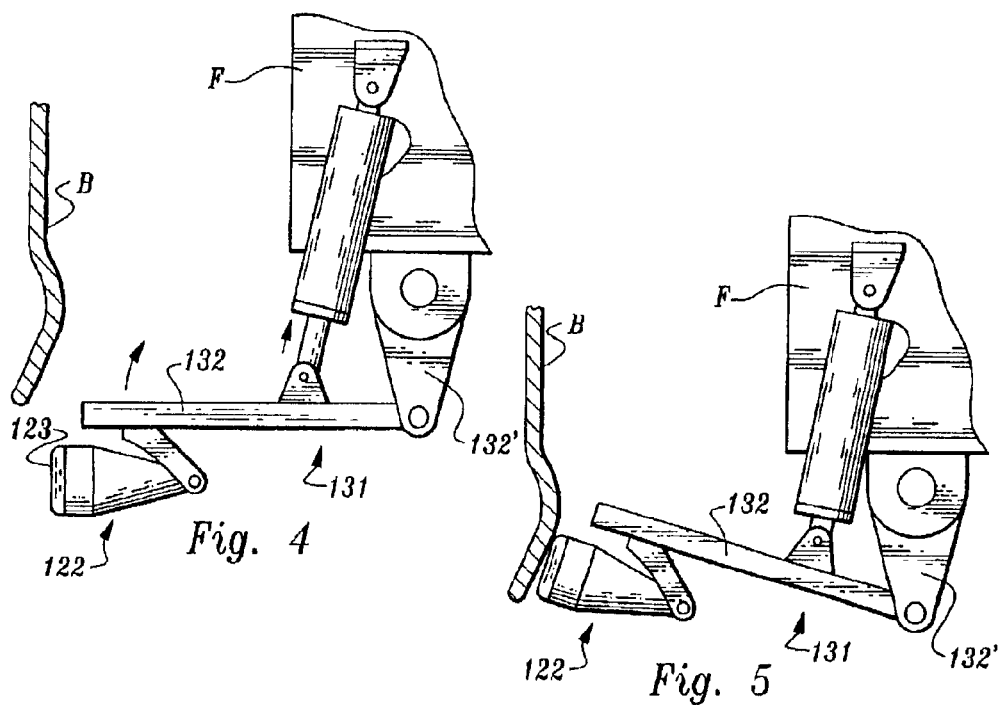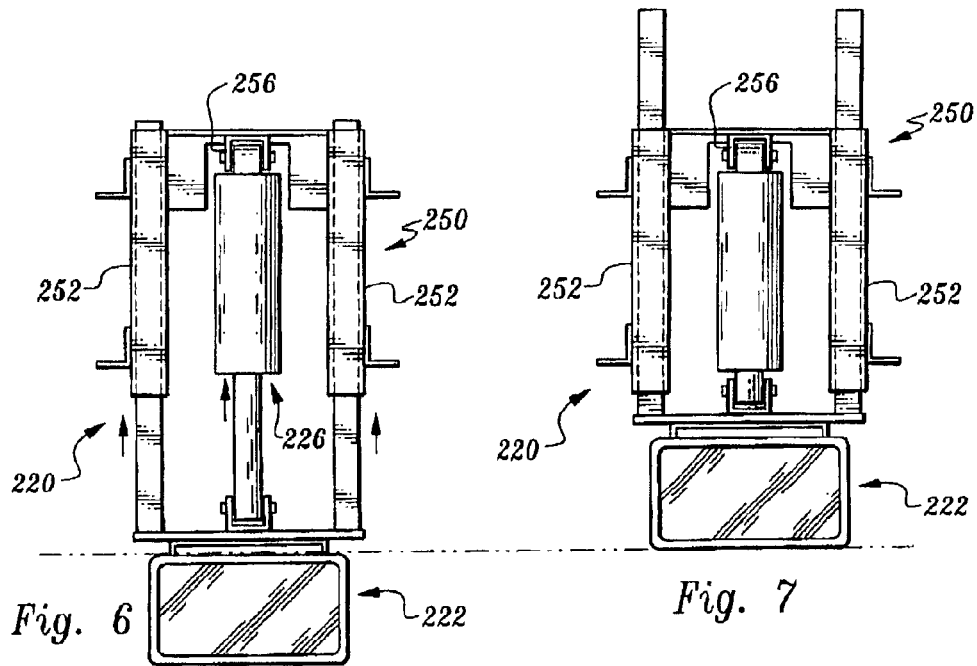

SELECTIVELY DEPLOYABLE DRIVING LIGHTS

The present invention relates generally to lighting systems for motor vehicles and, more particularly, to a lighting system which is selectively deployable by the operator under circumstances in which the lighting system is a necessary adjunct to safety, or simply an added convenience.

BACKGROUND OF THE INVENTION

1. Field of the Invention

Despite all efforts to curb America's love affair with the motor vehicle, the popularity of cars and, more recently, trucks has soared. Whether it be for pleasure or business, the preferred mode of transportation is by motor vehicle.

The transportation of material overland by truck is big business. Once a relatively benign daytime business, truckers now travel 24/7 in order to meet schedules and to get the most out of their motoring dollar. While the nation has an incomparable interstate system of roads and highways, in many parts of the country the system is aging and in various states of disrepair. Even in newer, well maintained venues, litter of all shapes and sizes poses a problem for those who use the highways, not only as to tires and windshields, but also to lighting systems, e.g., fog lights and driving lights, which, in order to optimize their effectiveness, are disposed relatively low to the ground. By virtue of their position, however, a variety of road hazards threaten the utility of such lighting systems.

2. Overview of the Prior Art

The present invention, while not the first to recognize the problems attendant such lighting systems, is perhaps one of the first to face squarely those myriad problems and offer a simple, yet affordable, alternative to systems currently marketed.

Retractable lighting of sorts goes back at least to 1937 when it first became available on aircraft. Landing lights were retracted into the wings in order to minimize drag, and Grimes U.S. Pat. No. 2,244,535 is an of such a system. In a later effort, Grimes, in his U.S. Pat. No. 2,859,331 taught a system for blimps.

In the mid 80's, and extending into the early 90's, various inventors, in recognition of the increasing popularity of trucks generally, and four wheel drive vehicles in particular, concentrated on the market for lighting bars which mounted above the roof of the cab. While originally the province of law enforcement, hunters and off road enthusiasts quickly recognized the value of such lighting bars, both from a utilitarian standpoint as well as a status symbol. The result was such devices as is depicted in, for example, Rich U.S. Pat. No. 4,707,014 in which a roof spoiler is provided with retractable lights. Rich later patented in his U.S. Pat. No. 4,787,665, a variation on the same theme.

Others later joined in the off road market feeding frenzy, such as McHugh in his U.S. Pat. No. 5,450,296, in which the entire light bar was rotated in and out of operative position. Mosher, in his U.S. Pat. No. 4,823,996 added to the existing art by rotating the lights, as well as the light bar. Stevens U.S. Pat. No. 5,481,441, and, once more, Rich in his U.S. Pat. No. 5,171,083, further refined the roof top light bar art.

Retractable head lights became a desirable accessory with the early Sting Ray line of Corvettes, and, later in other vehicles, General Motors used the same strategy by rotating headlights into and out of operative position, some by rotating them clockwise and others by rotation counterclockwise. Antrim U.S. Pat. No. 4,860,175 is an example of one such effort.

After WW II, auto manufacturers again concentrated on the domestic market and throughout the United States there were pockets of low visibility and fog that motorists would experience from time to time, typically without much warning as temperatures and dew points melded together. Riggs, in 1950, filed an application which issued into U.S. Pat. No. 2,662,605. He was one of the first to attempt to move fog lights into and out of the direction of movement of a vehicle and proposed that the light face upwardly in its retracted position.

Sumlin, in U.S. Pat. No. 4,769,746, a similar retractable lighting system was taught in which the light faced upwardly in its retracted position. In Hu U.S. Pat. No. 5,243,503 it was proposed that the lights slide left and right by means of a worm gear, so as to be hidden behind a license plate bracket when not in use.

Finally, in Tishman U.S. Pat. No. 4,482,939 the lights are moved into and out of an enclosure.

While these later referenced patents dance around the problem solved by the present invention, none have achieved any degree of commercial success, primarily because they do not pose a commercially acceptable solution.

SUMMARY OF THE INVENTION

The present invention relates specifically to the apparatus for retracting and extending lights as an integral part of a system in a manner which is both efficient and commercially feasible.

In accordance with the invention, lamps, as part of a lighting system, the lenses of which are particularly susceptible to damage by debris on the roadway, are moved into and out of the line of travel of a motor vehicle in a manner which renders them particularly useful under adverse driving conditions and relatively immune from damage from road hazards when not in use.

In accomplishing these objectives it is additionally a feature of the present invention that takes advantage of on board motive systems to operate, and thereby simplify, the mechanism required to operate the system.

Yet another objective of the present invention is to provide an electro mechanical system for moving lights, which system is relatively impervious to road hazards and, as such, is particularly free of maintenance requirements, and, as a consequence, reliable and operative when needed by the operator of the vehicle to which the system is integrated.

The foregoing as well as other objects and advantages of the present invention will become apparent to those skilled in the art from a reading of the Detailed Description of a Preferred Embodiment, taken in conjunction with the accompanying sheets of drawings, wherein:

BRIEF DESCRIPTION OF THE DRAWINGS

FIG. 4 is a side elevation of a portion of the lighting system of the present invention, providing a more detailed view of the mechanism for moving a light into and out of its in use position, and showing the light in its in use position;

FIG. 5 is a view similar to that of FIG. 4, but illustrating the light in its retracted position;

FIG. 6 is a frontal view of an alternative means of moving a light of the present lighting system into its in use position; and FIG. 7 is a view similar in scope to that of FIG. 6, but with the light in its retracted position.

DETAILED DESCRIPTION OF A PREFERRED EMBODIMENT

Figure 1:
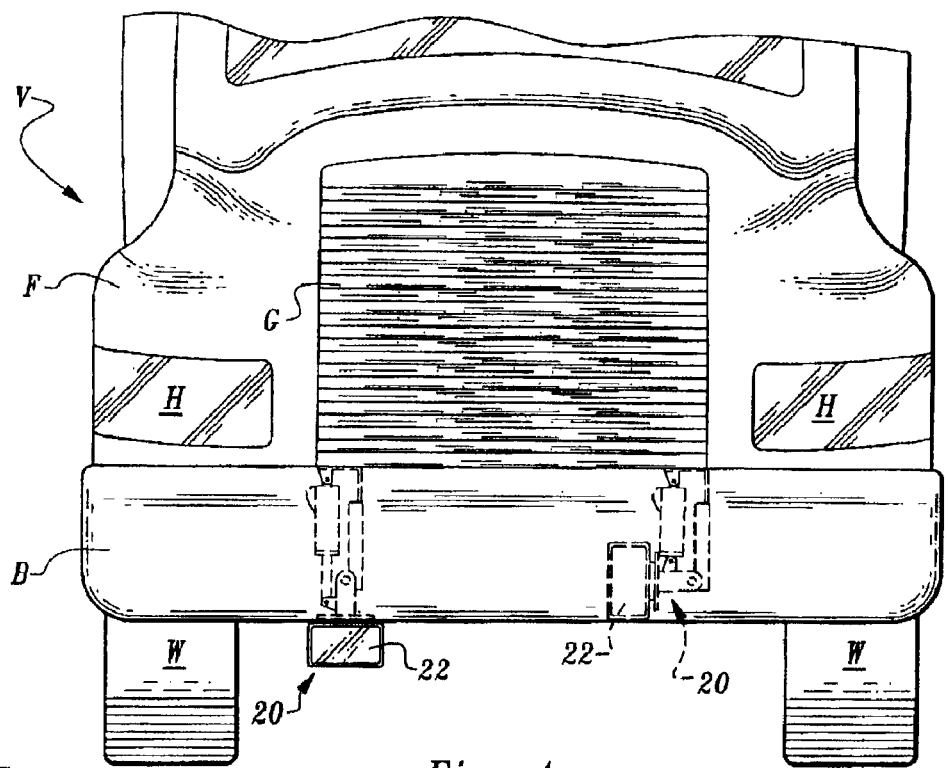
FIG. 1 is a frontal view of a motor vehicle of the type to which the present invention has particular, although not exclusive utility, and illustrating the various attitudes which the lamps of the system of the present invention are capable of assuming, one of which is shown in partial shadow.

With reference now to the drawings, and initially to FIG. 1, a depiction of a portion of the front of a representative motor vehicle V is provided. The front portion of the vehicle V shows a radiator grille G supported by the vehicle frame (not shown), bumper B, wheels W, and headlights H in the fenders F. It will be appreciated that the representation is of a truck type vehicle, because such vehicles have power systems P, e.g., fluid pressure systems, e.g., hydraulic, and/or pneumatic motivated, for operating brakes and the like, and, as such, the primary market for the present invention probably resides in such vehicles.

It will be understood, however, that the present lighting system is adaptable by the provision of a power system to more conventional passenger vehicles and even to off road and four wheel drive vehicles, including but not limited to, All Terrain Vehicles (ATV's).

As is immediately obvious, the vehicle V is equipped with an auxiliary lighting system 20 which is constructed in accordance with the present invention. The system 20 comprises at least a pair of lamp assemblies 22, which include a lamp 23, which lamp, depending on the requirements of the vehicle operator, may be equipped with amber lenses for fog or clear for driving.

It is within the contemplation of the invention that the number of individual lamp assemblies is a matter of choice, depending on the investment one is willing to make, coupled with the specific needs of the operator. No special significance should be attached to the showing of only two such assemblies in the system as depicted.

Figure 2:
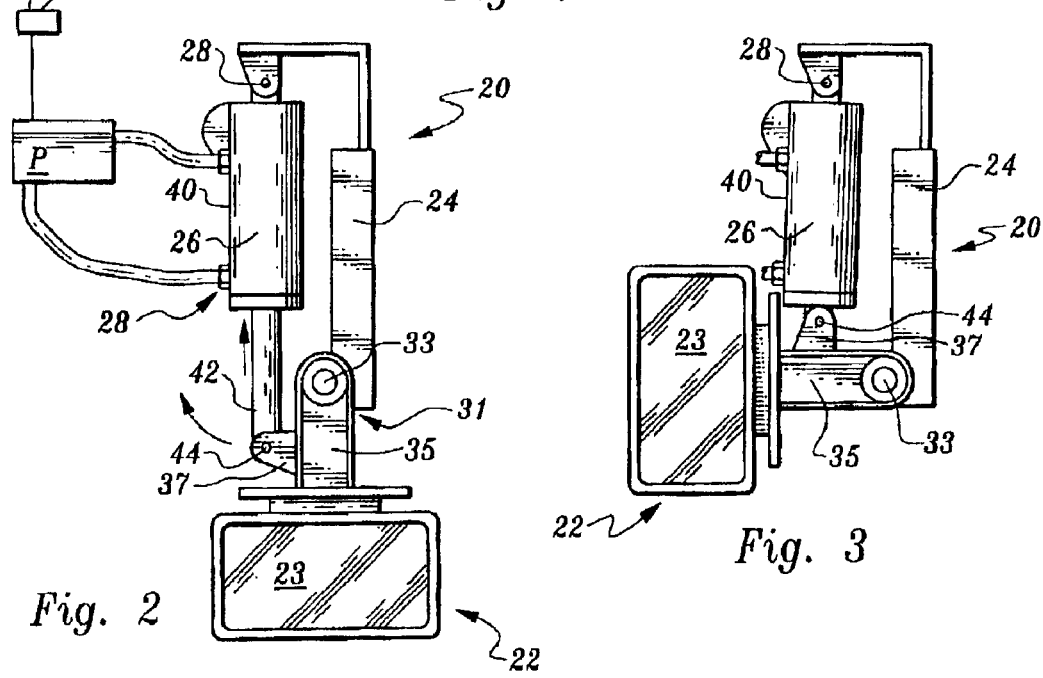
FIG. 2 is a view of a portion of the lighting system of the present invention, with a light in its extended and in use position, and graphically illustrating the simplicity of the system.
Figure 3:
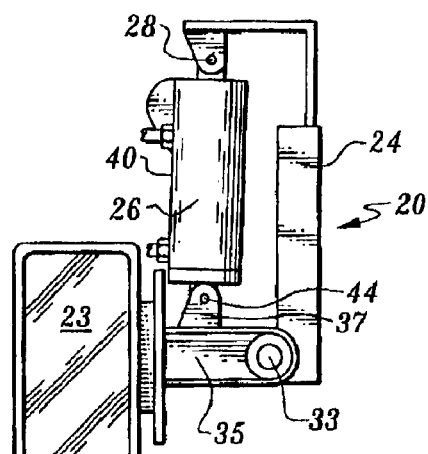
FIG. 3 is a view similar to FIG. 2, illustrating the light in its retracted position, which it would assume when not in use.

With reference now to FIGS. 2 and 3, each light assembly 22 comprises a bracket 24, which is, as illustrated, an "L" shaped bracket, adapted to mount to the frame or other rigid member of the vehicle V, behind the bumper B. A fluid motor 26 is mounted at mounting point 28 to the bracket 24 for limited rotation either coplaner with, or at least within a plane parallel to the bracket 24 and transverse to the direction of movement of the vehicle. It will be appreciated that while a fluid motor is used herein as indicating the use of hydraulic and/or pneumatic fluids for motive power, it is by way of example and not intended to exclude the use of electrical power or any combination of onboard power generating systems.

In a similar fashion, the lamp assembly 22 is mounted to the bracket at 31. The lamp assembly, so mounted, is capable of limited rotation about a transverse pin 33, either coplaner with the bracket or in a plane parallel therewith. More particularly, each lamp 23 is fixed to an extension 35, which supports the lamp 23 for rotation about the pin 33. The extension 35 is formed, or otherwise provided, with a tab 37.

The fluid motor 26 is relatively conventional in construction, having a cylindrical barrel 40, within which a piston (not shown) is reciprocated by the selective directional application of motive power. The piston moves a ram 42, which extends beyond the terminus of the barrel 40, in the plane of the barrel. The end of the ram 44 is pinned to the tab 37 so as to permit limited movement of the lamp assembly in response to the reciprocal motion of the ram 42.

As is typical of such motors, application of fluid pressure to one side or the other of the piston imparts motion to the ram, and a simple power system is illustrated at P, where a plenum containing fluid, e.g., air, or hydraulic fluid, is provided, preferably as part of the operating system of the vehicle V, and a toggle switch, or similar device S, is located within easy reach of the operator of the vehicle. By manipulation of the switch S, the operator can determine the movement, as well as the direction, of the ram 42 and, thus, the deployment, or stowage, of each lamp assembly.

It is in keeping with the objectives of the present invention that the lamp assemblies are stowed behind the bumper B so as to protect the of each lamp 23 against inadvertent contact with road hazards, such as stones, and other debris that often finds its way onto the highways and byways of the nation's roads.

It will be appreciated that this very simple movement results in each lamp being oriented in an attitude which is 90 degrees from that which results when the lamp is deployed. FIG. 3 is illustrative of this attitude. This change in orientation minimizes the amount of lens which might be exposed to debris that would inadvertently be kicked up behind the bumper B.

When deployed, however, the lamps 23 are disposed immediately below the bumper B and, thus, close enough to the surface of any road as to provide optimum visibility for the operator.

In some vehicle configurations, the bumper B extends well beyond the frame. In such configurations, it is difficult to protect the lamps from damage due to road hazards such as debris. A simple reorientation of the system, however, will meet this challenge.

With reference now to FIGS. 4 and 5, a lighting assembly 122 is supported by a bracket 131. The bracket 131 is generally "L" shaped with the lower arm extension 132 which is articulated about an upper arm 132'. The bracket 131 is oriented in the direction of the travel of the vehicle V, and the lower arm extension 132 is of such length that the light assembly 122 attached to its forward extremity is movable between a deployed attitude as seen in FIG. 4, and a stowed position as seen in FIG. 5, immediately behind the bumper B of the vehicle. A fluid motor 126 is affixed between a fixed member of the vehicle, such as the frame F.

The fluid motor 126 is controllable in the same manner as previously described with respect to FIGS. 1, 2 and 3, to move the lamp assembly in a coplaner fashion with the direction of movement of the vehicle, and, in this manner, the objective of protecting the lens of the lamp 123 is achieved, even with the bumper extended forwardly of the vehicle chassis.

In certain vehicle configurations, the bumper B is very close to the frame and chassis. In fact, it may be too close to permit the installation and operation of the systems such as shown in FIGS. 1 through 5. The present invention anticipates such eventualities and offers a simple solution.

Referring to FIGS. 6 and 7, the lighting system 220 conserves space between the frame F and the bumper B and comprises a lighting assembly 222, which is secured to a linear thruster 250. The linear thruster includes a pair of telescoping guide rods 252 which flank a fluid motor 226.

The barrel 240 is mounted in a trunnion 256, and the ram 242 attaches to the lighting assembly 222, wherein lamps 223 are supported by an extension 232.

Actuation of the fluid motor 226 results in linear movement in a vertical plane in order to move the light assembly between an operative position immediately below the bumper and its protected, stowed position behind the bumper.

Having thus described a preferred embodiment, it will be understood by those skilled in the art that minor changes in the configuration and design are well within the contemplation of the invention, and,

What is claimed, therefor, is:

1. An auxiliary lighting system for selectively deploying and stowing lamps as part of said system, said system being mounted to a motor vehicle having an onboard motive power system, said auxiliary lighting system including:
   at least two lamps,
   a bracket, said bracket being secured to said motor vehicle, and adapted to support said lamps for movement relative to said motor vehicle;
   a motor, said motor being attached to said bracket and said lamps, said motor being reversible;
   a switch, said switch being interposed between said motive system of said motor vehicle and said lamps, said switch being movable to cause said lamps to be rotated on an axis which is transverse to the plane of said lamps between a stowed position where it is protected from flying debris and an operative position such that said lamps are protected from road hazards in their stowed position.

2. The auxiliary lighting system of claim 1, wherein said bracket includes an extension, said extension being movable relative to said bracket, and said motor being connected between said bracket and said extension, and said lamps being connected to said extension.

3. The auxiliary lighting system of claim 1, wherein said motor vehicle has a front bumper, and said lamps being stowed behind said bumper.

4. The auxiliary lighting system of claim 1, wherein said lamps are rotated between their stowed and operative positions in a plane transverse to the direction of movement of said motor vehicle between said stowed and said operative position.

5. The auxiliary lighting system of claim 1, wherein said lamps are disposed immediately beneath said bumper and facing forwardly in the direction of said motor vehicle in their operative position.

6. The auxiliary lighting system of claim 1, wherein said onboard motive system being a fluid system.

7. The auxiliary lighting system of claim 6, wherein said motor comprises a piston reciprocally mounted in a barrel, and fluid from said onboard motive system being selectively directable to said motor to reciprocate said piston.

8. The auxiliary lighting system of claim 1, wherein said motor rotates said lamps in a clockwise direction between said stowed position and said operative position.

9. The auxiliary lighting system of claim 8, wherein said lamps are rotated in a plane parallel to the direction of movement of the vehicle.

10. The auxiliary lighting system of claim 2, wherein said motor vehicle has a front bumper, and said lamps being stowed behind said bumper.

11. The auxiliary lighting system of claim 2, wherein said lamps are rotated between their stowed and operative positions in a plane transverse to the direction of movement of said motor vehicle between said stowed and said operative position.

12. The auxiliary lighting system of claim 2, wherein said lamps are disposed immediately beneath said bumper and facing forwardly in the direction of said motor vehicle in their operative position.

13. The auxiliary lighting system of claim 2, wherein said onboard motive system being a fluid system.

14. The auxiliary lighting system of claim 2, wherein said lamps are rotated in a plane parallel to the direction of movement of the vehicle.

15. The auxiliary lighting system of claim 2, wherein said lamps are reciprocated between the said stowed position and said operative position.

* * * * *